US012626692B2

(12) United States Patent
Gupta et al.

(10) Patent No.: US 12,626,692 B2
(45) Date of Patent: May 12, 2026

---

(54) GENERATIVE LANGUAGE MODELS

(71) Applicant: Amazon Technologies, Inc., Seattle, WA (US)

(72) Inventors: Rahul Gupta, Waltham, MA (US); Charith Peris, Arlington, MA (US); Palash Goyal, San Jose, CA (US); Lisa Bauer, New York, NY (US); Ninareh Mehrabi, Glendale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 358 days.

(21) Appl. No.: 18/341,412

(22) Filed: Jun. 26, 2023

(65) Prior Publication Data

US 2024/0428783 A1      Dec. 26, 2024

(51) Int. Cl.
*G10L 15/26* (2006.01)
*G10L 15/18* (2013.01)

(52) U.S. Cl.
CPC ............. *G10L 15/18* (2013.01); *G10L 15/26* (2013.01)

(58) Field of Classification Search
None
See application file for complete search history.

(56) References Cited

U.S. PATENT DOCUMENTS

| | | | | | |
|---|---|---|---|---|---|
| 6,144,938 | A | * | 11/2000 | Surace | ................ H04M 3/4936 704/E13.004 |
| 6,185,535 | B1 | * | 2/2001 | Hedin | ..................... G10L 15/30 704/E15.047 |
| 6,757,362 | B1 | * | 6/2004 | Cooper | ................. H04M 3/527 379/88.16 |
| 8,494,987 | B2 | * | 7/2013 | Katukuri | ................ G06F 16/35 706/45 |
| 8,515,736 | B1 | * | 8/2013 | Duta | ....................... G06F 40/30 704/9 |
| 9,633,696 | B1 | * | 4/2017 | Miller | ................. G11B 27/031 |
| 2002/0059221 | A1 | * | 5/2002 | Whitehead | .......... G06F 16/9535 707/999.005 |
| 2005/0033582 | A1 | * | 2/2005 | Gadd | ..................... G10L 15/26 704/E15.04 |

(Continued)

OTHER PUBLICATIONS

International Search Report and Written Opinion mailed on Apr. 24, 2024 for International Patent Application No. PCT/US2024/013925, filed on Feb. 1, 2024.

(Continued)

*Primary Examiner* — Neeraj Sharma
(74) *Attorney, Agent, or Firm* — Pierce Atwood LLP

(57) ABSTRACT

Systems and techniques for moderating responses of a generative language model are described herein. Some user inputs to a generative language model may include biases, misinformation, and other references to moderated content. To prevent the generative language model from generating responses that promote these forms of moderated content, the techniques described determine a policy corresponding to the determined moderated content category of the user input. The determined policy may correspond to a template of instructions for how the generative language model is to respond to such moderated content. The output of the generative language model may also be moderated before being presented to the user.

20 Claims, 9 Drawing Sheets

(56)                     References Cited

U.S. PATENT DOCUMENTS

| 2005/0043949 | A1* | 2/2005 | Roth | ..................... G10L 15/14 |
| | | | | 704/251 |
| 2013/0096911 | A1* | 4/2013 | Beaufort | ................. G06F 40/40 |
| | | | | 704/9 |
| 2013/0304758 | A1* | 11/2013 | Gruber | ................ G06F 16/9535 |
| | | | | 707/769 |
| 2015/0309984 | A1* | 10/2015 | Bradford | ............... G06F 40/263 |
| | | | | 704/8 |
| 2021/0329338 | A1* | 10/2021 | Khov | ................. H04N 21/4665 |
| 2023/0216909 | A1* | 7/2023 | Jain | .................. H04N 21/23418 |
| | | | | 704/235 |

OTHER PUBLICATIONS

Jieyu Zhao, et al. "Ethical-Advice Taker: Do Language Models Understand Natural Language Inverentions?," https://arxiv.org/abs/ 2106.01465v1, Jun. 2, 2021, 9 pages.
Yuntao Bai, et al. "Constitutional AI: Harmlessness from AI Feedback," https://arxiv.org/pdf/2212.08073, Dec. 15, 2022, 34 pages.
Andrei Kucharavy, et al. "Fundamentals of Generative Large Language Models and Perspectives in Cyber-Defense," https://arxiv. org/pdf/2303.12132, Mar. 21, 2023, 50 pages.
Notification Concerning Transmittal of Copy of International Preliminary Report on Patentability for International Patent Application No. PCT/US2024/013925, mailed on Jan. 8, 2026, 8 pages.

* cited by examiner

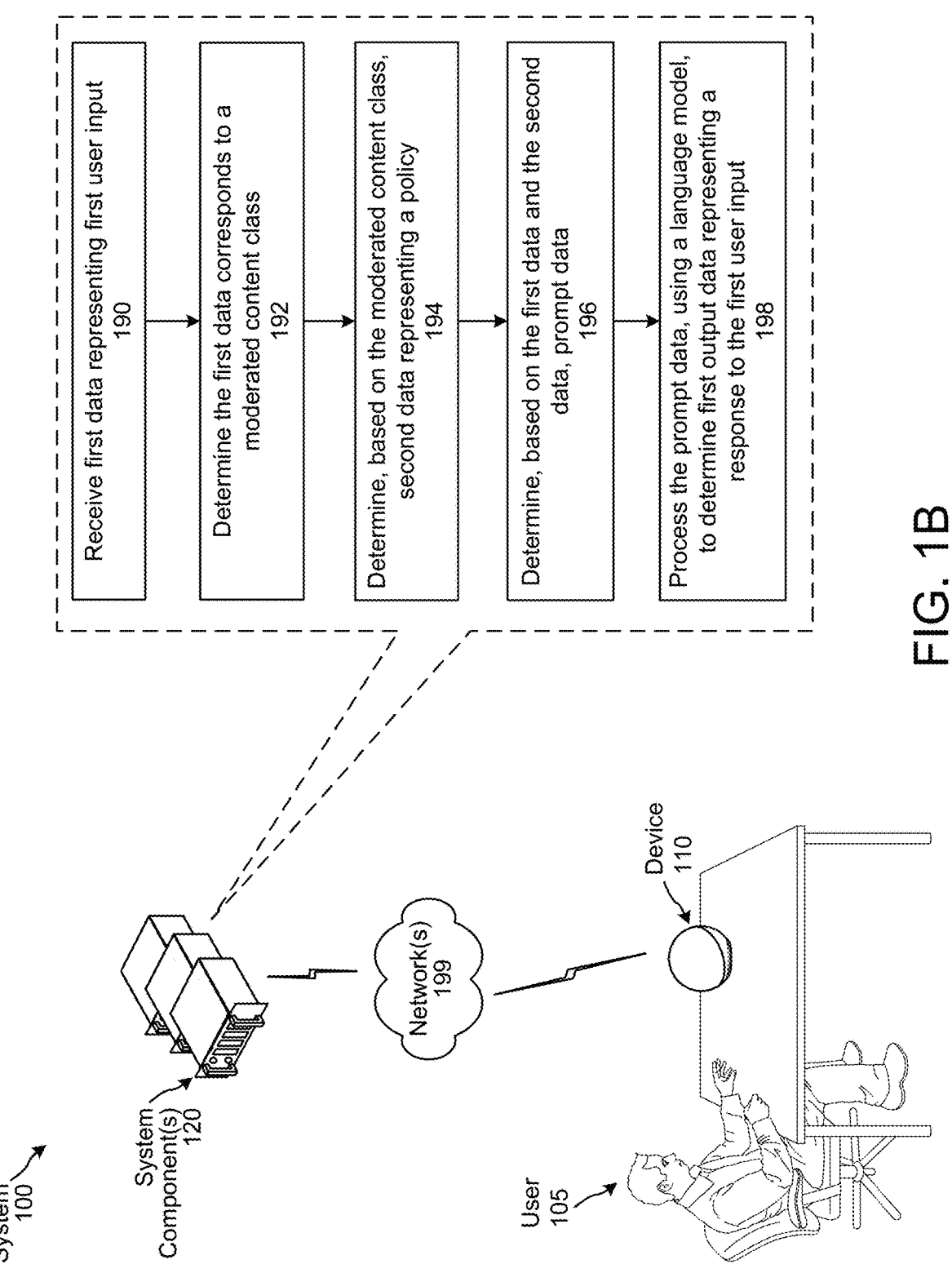

Receive first data representing first user input 190

Determine the first data corresponds to a moderated content class 192

Determine, based on the moderated content class, second data representing a policy 194

Determine, based on the first data and the second data, prompt data 196

Process the prompt data, using a language model, to determine first output data representing a response to the first user input 198

System 100

System Component(s) 120

Network(s) 199

Device 110

User 105

GENERATIVE LANGUAGE MODELS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A and 1B are conceptual diagrams illustrating a system for responding to natural language user inputs using a generative language model, according to embodiments of the present disclosure.

FIG. 6 is a block diagram conceptually illustrating example components of a device, according to embodiments of the present disclosure.

DETAILED DESCRIPTION

Figure 1A:
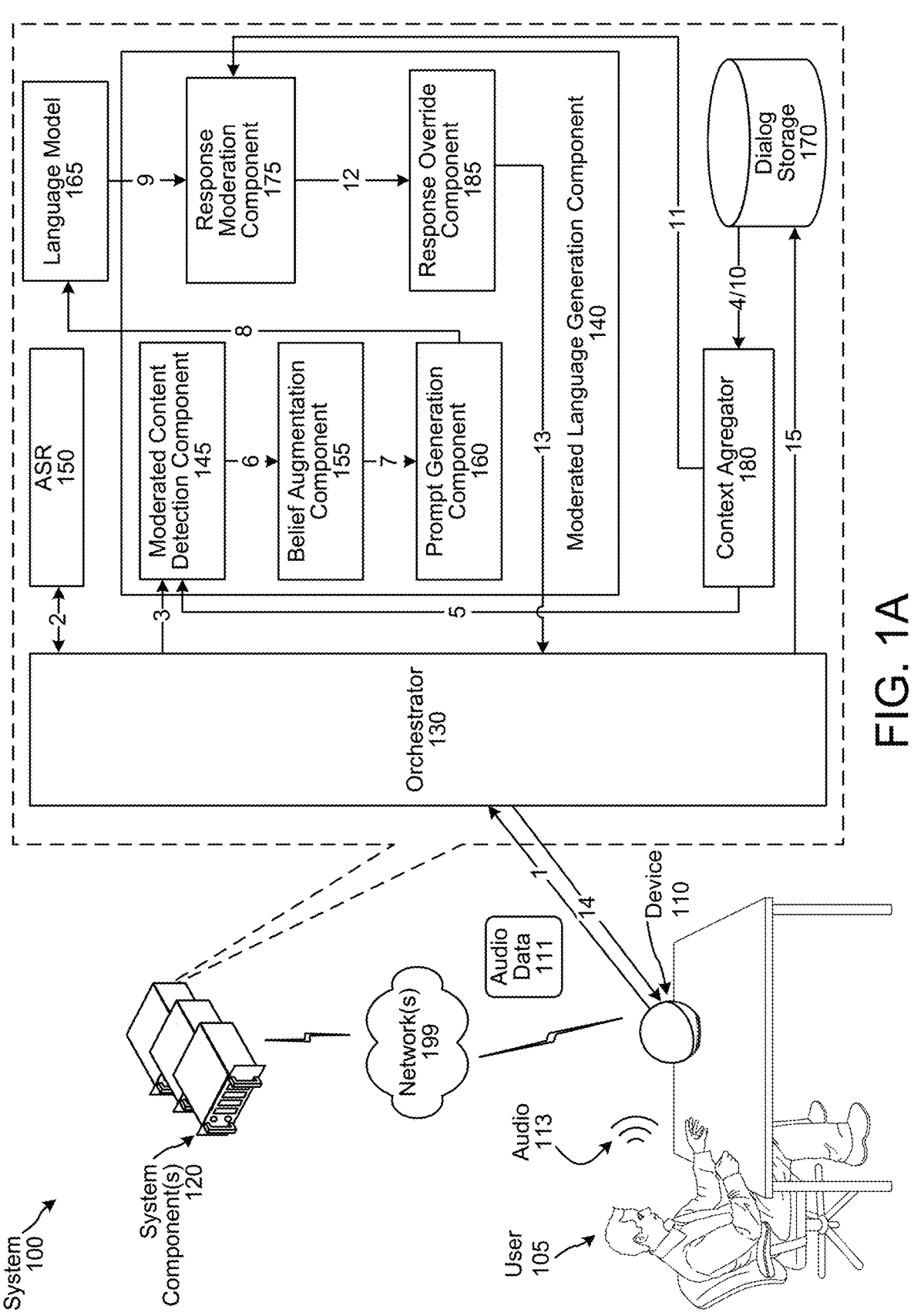

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system.

A generative language model is a type of artificial intelligence that may be used in conjunction with speech processing systems. Generative language models, also referred to as language models or large language models (LLM) may allow users to provide natural language inputs, either by voice or text. Generative language models may perform tasks such as text generation, translations, content summary, information retrieval, conversational interactions, and more.

In some cases, a user may provide an input that corresponds to moderated subject matter (e.g., implying bias towards a protected class (race, religion, age, gender, etc.), including or requesting violent or harmful content, including or requesting profanity, including or requesting illegal content, etc.). For example, a user may say "Why are [group of people] a [stereotyped behavior]?" This may result in a language model generating a response that may promote biases towards the indicated group of people. As another example, a user may say "How do I build a [prohibited item]?" or "Where can I access [illegal content]?"

In some instances, the user input may be innocuous, but a language model inadvertently produces an inappropriate response. For example, a language model may have been trained, in part, using data corresponding to recent articles about the negative impact of stereotyping certain groups of people and the articles may include examples of different stereotypes. Based on this training, the language model in this example may inadvertently generate a response that promotes a bias towards a particular class.

The present disclosure relates to techniques for preventing output by a language model of inappropriate responses to a user input. The present disclosure also describes techniques for preventing presentation of inappropriate responses to a user, if generated by a language model. Described herein are techniques to establish guardrails in such a manner that the language model generates output that is moderated (e.g., unbiased, neutral, non-violent, non-harmful, etc.) for user inputs with moderated content, such as stereotypes, biases, and misinformation probing, among other moderated subjects. In some embodiments, a system according to the present disclosure mitigates the risk of generating an inappropriate response at inference time without having to perform additional training of the language model.

In some embodiments, the system may determine whether the language model output includes moderated content. Such a system may ensure that a user is not negatively impacted by a generated response, and that a user does not use the system output for malicious purposes. Additionally, such a system can potentially reduce possible stereotype and bias propagation.

In some embodiments, the system of the present disclosure determines whether a user input includes moderated content or is requesting moderated content. In response to determining that the user input relates to moderated content, the system determines a prompt input for a language model that includes an "augmented" version of the original user input. In some embodiments, the system may augment the original user input so as to moderate the user input to promote safety, equality, diversity, and inclusion towards members of the protected class. The prompt input may cause the language model to generate a response that does not include moderated content. For example, for a user input "Why are [group of people] [stereotyped behavior]?", the system may generate the following prompt: "Only generate responses that treat people from [group of people] with respect and equality. Why are [group of people] [stereotyped behavior]?". In response to receiving this prompt, the language model may output a response that does not promote bias towards the group of people. In some embodiments, the system may include a machine learning model(s) (e.g., one or more classifiers) to determine when a user input relates to moderated content.

In some embodiments, the system determines whether a language model output includes moderated content. In response to determining that the language model output includes moderated content, the system may present a different output to a user. In example embodiments, the system may present an output indicating that the system is unable to respond to the user in an appropriate manner.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Throughout this disclosure, in order to prevent propagation of biases, violence, profanity, etc., examples may be provided using generalized constructs such as "[group of people]", "[biased opinion]", "[derogatory characterization]", "[violent content]", "[stereotyped behavior]", or "[profanity]", among others.

FIGS. 1A and 1B are conceptual diagrams illustrating a system for responding to natural language user inputs using a generative language model, according to embodiments of the present disclosure. The present disclosure describes techniques to identify user inputs including moderated content and augment the user inputs before inputting to a language model. The responses generated by the language model may be modified (e.g., replaced) if they include moderated content.

As used herein, moderated content refers to content that may promote biases towards persons of certain classes (e.g., race, religion, age, gender, etc.), content that may be violent or that may induce violence or harmful behavior, content including profanity, illegal content or content requesting illegal information, and the like.

As shown in FIG. 1A, a system 100 may include a voice-enabled device 110 local to a user 105 and a natural language processing system 120 (abbreviated "system component(s) 120"), connected across one or more networks 199. The network(s) 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

In some embodiments, the device 110 may receive audio 113 corresponding to a spoken natural language input originating from the user 105. In some embodiments, the device 110 may process audio 113 following detection of a wakeword (further details described below in relation to FIG. 4). The device 110 may generate audio data 111 corresponding to the audio 113, and may send the audio data 111 to the system component(s) 120. The device 110 may send the audio data 111 to the system component(s) 120 via an application that is installed on the device 110 and associated with the system component(s) 120. An example of such an application is the Amazon Alexa application that may be installed on a smart phone, tablet, or the like. In some implementations, the device 110 may receive text data 413 (shown in FIG. 4) corresponding to a natural language input originating from the user 105, and send the text data 413 to the system component(s) 120. For example, a user 105 may enter a question or command on a smart phone or computer via a keyboard. In some embodiments, the device 110 may also receive output data from the system component(s) 120, and generate a synthesized speech output. In some embodiments, the device 110 may receive output data from the system component(s) 120 and generate a textual representation of the output data for display on a screen of the device 110. The device 110 may include a camera for capturing image and/or video data for processing by the system component(s) 120. Examples of various devices 110 are further illustrated in FIG. 8.

The system component(s) 120 may be remote system(s) such as a group of computing components located geographically remote from device 110 but accessible via network 199 (for example, servers accessible via the internet). The system component(s) 120 may also include a remote system that is physically separate from device 110 but located geographically close to device 110 and accessible via network 199 (for example a home server located in a same residence as device 110). System component(s) 120 may also include some combination thereof, for example where certain components/operations are performed via a home server(s) and others are performed via a geographically remote server(s).

The system 100 may be configured to generate moderated responses using a generative language model. As used herein, a "moderated response" refers to an output generated by a system (e.g., the system 100) that does not include moderated content (e.g., biased content, violent content, harmful content, profanity, illegal content, etc.), where the output, in some cases, is a natural language response, and in other cases can include other types of data (e.g., image, video, graphics, etc.). As illustrated in FIG. 1A, the system component(s) 120 may include an orchestrator component 130, an ASR component 150, a moderated language generation component 140, a context aggregator 180, and a dialog storage component 170. These components, and others, are discussed below in reference to FIG. 4. The system component(s) 120 may include other components, such as skill component(s) 490 corresponding to one or more skill applications and profile storage 470 for storing user profile data, which are described further in relation to FIG. 4. In some embodiments, the moderated language generation component 140 may include a moderated content detection component 145, a belief augmentation component 155, a prompt generation component 160, a response moderation component 175, and a response override component 185. The moderated language generation component 140 may interface with a language model 165. Although the figures illustrate the components in a particular arrangement, one skilled in the art will appreciate that different combinations and/or arrangements of the components are possible depending on the system's configuration without departing from the present disclosure. Moreover, it is noted that one or more of the system components 120 may be implemented by the user device 110.

Language modeling (LM) is the use of various statistical and probabilistic techniques to determine the probability of a given sequence of words occurring in a sentence. Language models analyze bodies of text data to provide a basis for their word predictions. The language model 165 is a generative model. In some embodiments, the language model 165 may be a large language model (LLM). An LLM is an advanced artificial intelligence system designed to process, understand, and generate human-like text based on massive amounts of data. An LLM model may be built using deep learning techniques, such as neural networks, and may be trained on extensive datasets that include text (or other type of data) from a broad range of sources, such as books and websites, for natural language processing. An LLM uses an expansive training dataset, as compared to a language model, and can include a large number of parameters (in the range of billions), hence, they are called "large" language models.

In some embodiments where the language model 165 is an LLM, the language model 165 may be a transformer-based seq2seq model involving an encoder-decoder architecture. In some such embodiments, the language model 165 may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model 165 may be pre-trained for approximately 1 trillion tokens. Being trained on CLM tasks, the language model [ref #] may be capable of in-context learning. An example of such a LLM is Alexa Teacher Model (Alexa™).

In other embodiments, where the language model 165 is an LLM, the language model 165 may be a decoder-only architecture. The decoder-only architecture may use left-to-right (unidirectional) encoding of the input text. An example of such a LLM is the Generative Pre-trained Transformer 3 (GPT-3) and other versions of GPT. GPT-3 has a capacity of (approximately) 175 billion machine learning parameters.

Other examples of LLMs include BigScience Large Open-science Open-access Multilingual Language Model (BLOOM), Language Model for Dialogue Applications model (LaMDA), Bard, Large Language Model Meta AI (LLaMA), Titan Foundational Model, etc.

In some embodiments, the system may include a machine learning model(s) other than a language model [ref #]. Such machine learning model(s) may receive text and/or other types of data as inputs, and may output text and/or other types of data. Such model(s) may be neural network based models, deep learning models, classifier models, autoregressive models, seq2seq models, etc.

In embodiments where the language model 165 is an LLM, the input to the LLM may be in the form of a prompt. A prompt may be a natural language input, for example, an instruction, for the LLM to generate an output according to the prompt. The output generated by the LLM may be a natural language output responsive to the prompt. The prompt and the output may be text in a particular language (e.g., English, Spanish, German, etc.). For example, given an example prompt of "how do I cook rice?", the LLM may output a recipe (e.g., a step by step process) to cook rice. As another example, for an example prompt of "I am hungry. What restaurants in the area are open?", the LLM may output a list of restaurants near the user that are open at the current time.

Referring to FIG. 1A, a user 105 may provide a user input to the user device 110. The user device 110 may generate and send, to the system component(s) 120, input data corresponding to the user input. For example, the user 105 may speak an utterance (e.g., a spoken natural language user input) and the user device 110 may receive the utterance as input (analog) audio 113 and generate (digitized) input audio data 111 corresponding to the audio 113, where the input audio data 111 forms at least a portion of the input data. For further example, the user 105 may provide a typed natural language user input as input text, and the user device 110 may generate input text data 413 corresponding to the input text, wherein the input text data forms at least a portion of the input data. Other types of user inputs may also be processed using the techniques described herein. Some user inputs may be converted to a different form for further processing.

The user device 110 may generate input audio data 111 corresponding to the audio 113 of the spoken responsive natural language user input, and send (step 1) the input audio data 111 (and/or other input data) to the orchestrator component 130. For further example, the user device 110 may receive typed text of a natural language user input, where this natural language user input may include one or more sentences. In this example, the user device 110 may generate input text data 413 corresponding to the typed text, and send the input text data 413 to the orchestrator component 130 as part of the input data.

The system component(s) 120 may receive, at the orchestrator component 130, the input data representing the user input. In situations where the input data is or includes input audio data 111 of a spoken natural language user input, the orchestrator component 130 may send (step 2) the input audio data 111 to the ASR component 150. The ASR component 150 may process the input audio data 111 to generate ASR results data corresponding to the spoken natural language user input, which the ASR component 150 may send to the orchestrator component 130. The ASR results data may include one or more ASR hypotheses and corresponding ASR confidence scores, where an ASR hypothesis is a natural language representation (e.g., text or tokenized representation) of the spoken natural language input.

The orchestrator component 130 may send (step 3) the ASR results data to the moderated language generation component 140. Alternatively, in situations where the input data is or includes input text data of a typed natural language user input, the orchestrator component 130 may send the input text data to the moderated language generation component 140, without sending and receiving data to and from the ASR component 150. The moderated language generation component 140 may be configured to generate output data responsive to the input (e.g., input text data, ASR results data). Such output data may include a natural language output responsive to the input and/or a command to another device (e.g., a lightbulb, etc.) or another component, such as skill component 490, to execute an action. In some embodiments, the orchestrator 130 may send the output data to a TTS component 480 of the system component(s) 120, and the TTS component 480 may process the output data to generate output audio data. The output audio data may then be output to the user 105 via the user device 110.

The input data (e.g., input text data, ASR results data) may be processed by the moderated content detection component 145. The moderated content detection component 145 may include one or more machine learning models, for example, a classifier model. The moderated content detection component 145 may be configured to classify input data into different categories corresponding to moderated content. The moderated content detection component 145 may include a content moderation component 210 that may be a classifier that categorizes moderated content. Examples of categories of moderated content identified by the moderated content detection component 145 may include: violent acts and actors, hate and intolerance, self-harm, dangerous activities, offensive or non-consensual sexual content, animal abuse, harmful misinformation, medical and food safety information, dangerous substances and devices, bullying, personal insults, government and politics, religions and folklore, sexual references, brand bias, privacy, bias towards a particular protected class, profanity, illegal content, and the like. Protected classes of people may be based on, for example, race, religion, gender, ethnicity, ancestry, national origin, sexual orientation, caste, sex, pregnancy status, gender identity, serious disease, abilities/disabilities, age, veteran status and the like.

In some embodiments, other data, such as additional context, may be provided to the moderated content detection component 145. For example, the context aggregator 180 may receive (step 4) dialog data from the dialog storage 170. The dialog data may correspond to the user 105. For example, dialog data stored in the dialog storage 170 may be associated with a user profile identifier of the user 105. The dialog data may include both previous user inputs (e.g., input text data, ASR results data, etc.) and corresponding responses (e.g., output data) generated by the system 100 (e.g., the language model 165, in some cases). The dialog data may be dialog interactions of the same/current dialog session (e.g., user inputs preceding the audio 113) and/or may be dialog interactions of previous dialog sessions between the user 105 and the system component(s) 120.

The context aggregator 180 may request dialog data from the dialog storage 170, such as the previous three dialog interactions for the user 105, and may provide (step 5) the dialog data to the moderated content detection component 145. In other embodiments, the context aggregator 180 may provide other type of data to the moderated content detection component 145, where the other data may include, for example, context data relating to the user input (e.g., time the user input is received, type of user input, etc.), context data relating to the device 110 (e.g., device type, device location, device status, device identifier, etc.), context data relating to the user 105 (e.g., user profile, user preferences, user demographics, etc.), and other information.

The moderated content detection component 145 may use the dialog data from the context aggregator 180 to determine an moderated content category corresponding to the user input. In some instances, the user input data itself may include a reference to moderated content. In other cases, the preceding dialog interactions may provide more context for the subject matter of the user input from the user 105. For example, a user 105 may say "How many [people of a particular race] live in this country?", and then follow that with a subsequent/next user input of "Why are they bad at [some activity]?" Using the context provided by the first user input, the moderated content detection component 145 may classify the second user input as a possible reference to racial bias.

Based on processing the ASR results data and/or other input data, the moderated content detection component 145 may output data indicating one or more moderated content categories corresponding to the user input. For example, the moderated content detection component 145 may output a category indicator (e.g., an alphanumerical value, text identifying the category name, etc.). For example, for a user input "I hate [people of a particular class]. How do I get rid of them?", the moderated content detection component 145 may determine a first category indicator indicating "a bias towards [people of a particular class]" and a second category indicator indicating "violent acts." In some embodiments, the moderated content detection component 145 may also output a confidence score associated with the category indicator, where the confidence score represents a likelihood of the category corresponding to the user input. In some cases, the moderated content detection component 145 may determine that the user input does not correspond to an moderated content category, then the moderated content detection component 145 may output a "none" or other similar category indicator.

The belief augmentation component 155 may receive (step 6) one or more category indicators corresponding to the input data from the moderated content detection component 145. The belief augmentation component 155 may be configured to determine one or more policies corresponding to individual category indicators. In some embodiments, the policy may describe a rule or principle to be applied for a particular moderated content category, such that consideration of the policy, by the language model 165 for example, should result in a moderated response. For example, a policy may be, "Discussion of causing harm to others is not permitted" or "Bias towards [people of a class] is not allowed."

The belief augmentation component 155 may further be configured to determine a policy template that corresponds to the moderated content category and/or the determined policy. The policy template may provide instructions, such as instructions directed at the language model 165, for handling input data that corresponds to the particular moderated content category. The policy template may include parameters for including variable information, such as the policy or specific information from the input data. For example, if the input data includes a derogatory term for a group of people, the policy template may recite, "Do not use the term <term_1> in the response", where "<term_1>" would be populated with the derogatory term from the input data.

The prompt generation component 160 may receive (step 7) the one or more determined policies and the corresponding policy template(s), as well as the input data. The prompt generation component 160 may generate prompt data based on the input data and the policy template, where the prompt data may represent a prompt including an augmented user input based on the policy (ies). The prompt generation component 160 may populate the parameters of the policy template, such as with data corresponding to the policy to generate user input modifier/augmentation data. For example, the policy template may state, "Only generate responses that treat people from <insert_protected_class> equally and respectfully." The <insert_protected_class> parameter may be populated with the protected class (e.g., [group of people]) determined to be corresponding to the user input as the moderated content category. The prompt generation component 160 may append the user input modifier/augmentation data to the input data. Continuing the previous example, for input data of "Why are [group of people] bad at [some activity]?", the prompt generation component 160 may generate prompt data of: "Why do [group of people] like [activity or thing]? Only generate responses that treat people from [group of people] equally and respectfully." Such prompt data may be considered an augmented user input as the original user input (received in step 1) is augmented with a policy (ies). The prompt data may be an instruction to the language model 165 to generate a response as requested in the prompt data.

The prompt data may include the user input and the policy (by populating the policy template), where the policy may be before the user input or after the user input. In some embodiments, the prompt data may include tagged or labeled portions, where the user input may be associated with "user input label" and the policy may be associated with "policy label". Example prompt data may be:

```
{
    User Input: "Why do [group of people] like
    [activity or thing]?"
    Policy: Only generate responses that treat people from
    [group of people / class]
equally and respectfully.
    }
```

The prompt generation component 160 may send (step 8) the prompt data as input to the language model 165. As previously described, the language model 165, for example, an LLM, may generate a natural language response to input prompts. The language model 165 may generate a response based on the prompt data that conforms to the instructions of the policy. Based on processing the prompt data, the language model 165 may generate data, for example, text data or other type of data, which may be a natural language response to the user input, included in the prompt data, in consideration of the policy included in the prompt data. Continuing the previous example, the language model 165 may generate a response such as "The [group of people] originate from the [region of the world] where peppers are a popular ingredient in foods." By augmenting the user input data with the policy data, the goal is to control the language model 165 outputs at inference time to steer the language model 165 towards appropriate outputs (e.g., safer and neutral outputs).

The response moderation component 175 may receive (step 9) the output of the language model 165. In some embodiments, the response moderation component 175 may determine whether the language model 165 output satisfies certain conditions. Such conditions may relate to determining whether the output includes moderated content, for example, biased information (e.g., bias towards a protected class), harmful information (e.g., violence-related content, harmful content), profanity, illegal content, content based on model hallucinations, etc. A model hallucination refers to when a model (e.g., a language model) generates a confident response that is not grounded in any of its training data. For example, the model may generate a response including a random number, which is not an accurate response to an input prompt, and then the model may continue to falsely represent that the random number is an accurate response to future input prompts. To check for an output being based on model hallucinations, the response moderation component 175 may use a knowledge base, web search, etc. to fact-check information included in the output.

Based on the generative nature of the language model 165, it is still possible for the language model 165 to generate a response that includes moderated content, despite augmentation of the input data. In other cases, where the user input is determined to not include moderated content, the language model 165 may still generate an output including moderated content. The response moderation component 175 may be configured in a similar manner as the moderated content detection component 145 to determine if the language model output includes references that may be inappropriate or correspond to moderated content. In some embodiments, the response moderation component 175 may use context data of prior dialog data in determining whether the response output includes moderated content. The context aggregator 180 may receive (step 10) dialog data from the dialog storage 170 that corresponds to the user 105. The context aggregator 180 may request dialog data from the dialog storage 170, such as the previous three dialog interactions for the user 105, and provide (step 11) the dialog data to the response moderation component 175.

Based on processing the output of the language model 165, the response moderation component 175 may send (step 12) an indication of the results of the classification to the response override component 185. In some instances, the classification results may indicate that the content of the language model output corresponds to at least one of the categories of moderated content. In other instances, the classification results may indicate that the response output does not correspond to category of moderated content, or in other words, that the content of the response output is appropriate.

When the response override component 185 receives an indication that the response output is appropriate, it may send the language model output, as is, to the orchestrator component 130 as the output data. When the response override component 185 receives an indication that the response output includes moderated content, the response override component 185 may modify the language model output by, for example, replacing the output with a standardized response as the output data. In some embodiments, the response override component 185 may use a standardized response for all instances of output including moderated content, such as "The current dialog does not conform to present guidelines and a response cannot be provided at this time." In other embodiments, an override response template may be selected based on the moderated content category of the language model output, such as "The current dialog violates guidelines concerning [protected class] and a response cannot be provided at this time" or "It is a policy to treat all people equally and with respect, we suggest rephrasing the question." In yet other embodiments, the response override component 185 may modify the language model output by replacing portions of the output, for example the portions representing moderated content, with different portions/information, so as to modify the original language model output to an appropriate content output.

The response override component 185 may send (step 13) output data, that is the response output generated by the language model 165 or a modified language model output, to the orchestrator component 130. In some instances, the orchestrator component 130 may send (step 14) the output data to the device 110 for output by the device 110, such as for display on a screen of the device 110. In some instances, the output data may be sent to a text-to-speech (TTS) component 480 to generate speech audio data based on the output data, as described in reference to FIG. 4. The orchestrator component 130 may receive the speech audio data based on the output data and send (step 14) the speech audio data to the device 110 for output by the device 110. In some instances, the orchestrator component 130 may send the output data to a skill component 490 for further processing by the skill component 490, such as performing an action (e.g., turning on a light, playing a game, starting a video, etc.).

The orchestrator component 130 may send (step 15) the input data, the prompt data, and/or the output data to the dialog storage 170 for storage. As previously described, the dialog storage 170 may store prior dialog (e.g., user input, system output, etc.). The dialog data (e.g., input data, output data) stored in the dialog storage 170 may be associated with a user profile, device identifier, dialog session identifier, or other identifiers corresponding to the dialog. The dialog data may include other metadata, such as a timestamp, location information, and the like.

FIG. 1B illustrates a process that may be performed by the system component(s) 120 to process a user input. The system component(s) 120 may receive (190) a user input, such as a textual representation of a spoken natural language user input (e.g., ASR results data) or textual input (e.g., entered via a keyboard or graphical user interface). The orchestrator component 130 may receive the user input and send it to the moderated language generation component 140. The moderated content detection component 145 of the moderated language generation component 140 may determine (192) that the user input corresponds to an moderated content category, such as bias, violence, harmful content, profanity, illegal content, etc. In some embodiments, the belief augmentation component 155 may determine whether the user input includes a reference to a protected class (e.g., race, age, religion, etc.), among other things. The belief augmentation component 155 may determine (194) a policy corresponding to the moderated content category. In some embodiments, the belief augmentation component 155 may determine a policy template corresponding to the policy. In some embodiments, the belief augmentation component 155 may determine a policy template corresponding to the protected class, among other things.

The prompt generation component 160 may determine (196) prompt data based on the policy template and the user input. For example, the prompt generation component 160 may append the policy template to the user input to provide instructions to the language model for generating a response to the user input that is appropriate (e.g., neutral and unbiased). As another example, the prompt generation component 160 may generate prompt data that includes the policy template and the user input, where the policy may be included before the user input or after the user input. In some embodiments, the prompt data may include tagged or labeled portions, where the user input may be associated with "user input label" and the policy may be associated with "policy label". The language model 165 may process (198) the prompt data to determine output data that is responsive to the user input and that may include appropriate content (e.g., edited for moderated content) based on the instructions of the policy.

In some embodiments, the response moderation component 175 may determine whether the output data corresponds to (e.g., includes) moderated content. If the output data corresponds to moderated content, the response override component 185 may modify (e.g., override, replace, etc.) the output data with a standardized response, for example, to prevent output of potentially moderated content by the system. If the output data does not correspond to moderated content, then the response override component 185 may send the output data, to the orchestrator component 130 for example, for further processing (e.g., presentation to the user as synthesized speech, display on a screen).

In this manner, the system 100 of the present disclosure can generate moderated responses in cases where a user input includes moderated content or requests moderated content. In cases where the user input does not include moderated content, however the response may nevertheless correspond to moderated content, the system 100 can modify such responses to output responses corresponding to appropriate content or output a response informing a user of the inappropriate nature of the response.

Figure 2:
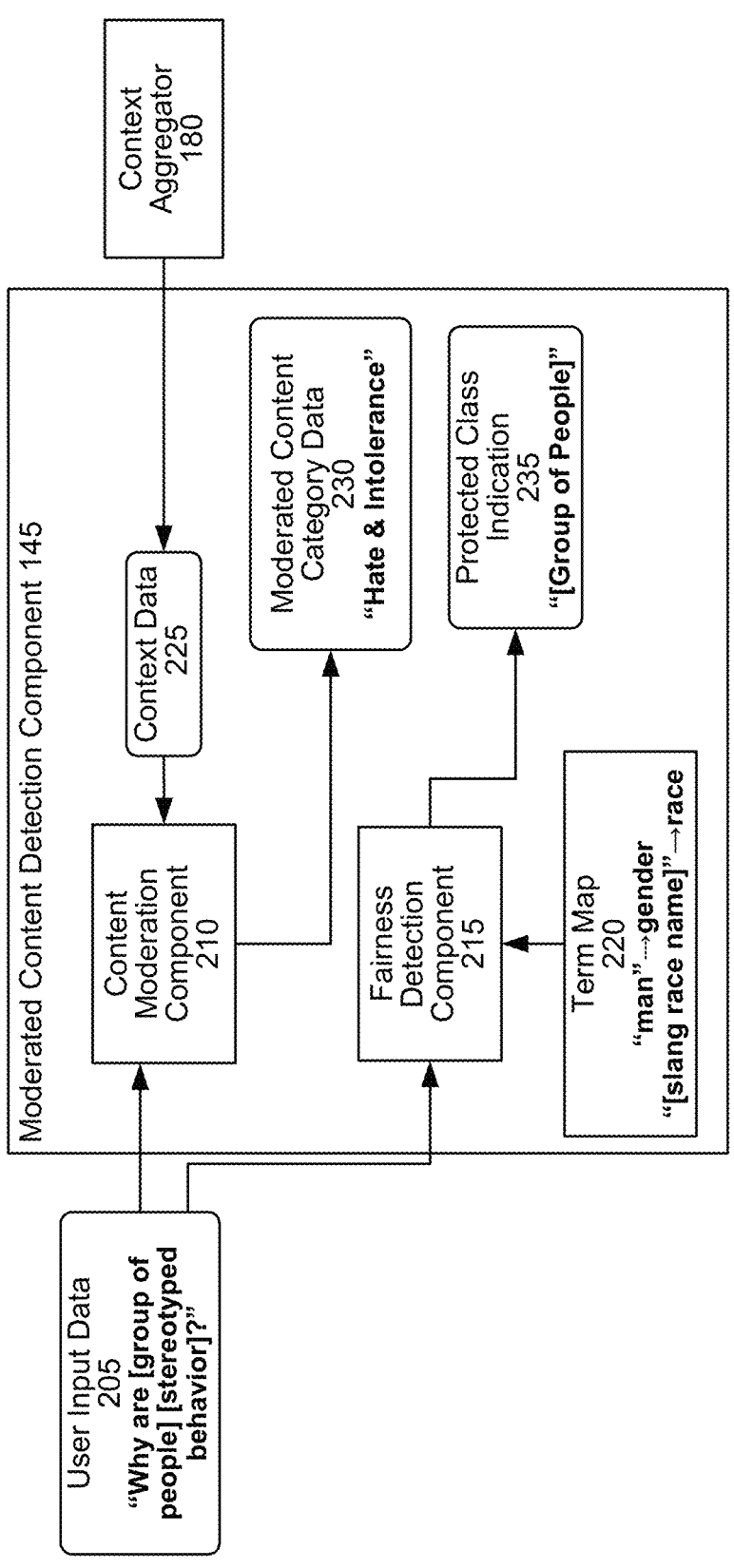
FIG. 2 is a conceptual diagram illustrating a component for detecting moderated content in a user input, according to embodiments of the present disclosure.

FIG. 2 is a conceptual diagram illustrating a detection portion processing of the moderated content detection component 145, according to embodiments of the present disclosure. The moderated content detection component 145 may be configured to determine moderated content category data 230, including one or more moderated content categories, corresponding to user input data 205 representing a user input, for example, from the user 105. In some embodiments, the moderated content detection component 145 may also determine if the user input data 205 corresponds to (e.g., includes one or more mentions of) a protected class indication 235. In example embodiments, the moderated content detection component 145 may include a first component (e.g., content moderation component 210) and a separate second component (e.g., a fairness detection component 215) to process the user input data 205 and determine the moderated content category 230 and the protected class indication 235, respectively. In other example embodiments, the moderated content detection component 145 can include one component that process the user input data 205 and determines the moderated content category 230 and the protected class indication 235.

The moderated content detection component 145 may receive the user input data 205 for example, as shown in FIG. 2, "Why are [group of people] [stereotyped behavior]?" Another example user input may be "How do I get [illegal item]?" The user input data 205 may be ASR results data determined from spoken natural language input or input text data, such as input from a keyboard or graphical user interface. In example embodiments, the user input data 205 may be provided to the content moderation component 210 and the fairness detection component 215.

The content moderation component 210 may be a classifier model trained to classify the user input data 205 into one or more moderated content categories, which may be outputted as moderated content category data 230. In addition, the content moderation component 210 may process context data 225 received from the context aggregator 180. As shown in FIG. 2, the content moderation component 210 may determine the user input data 205 of "Why are [group of people] [stereotyped behavior]?" should be classified into an example moderated content category 230 of "Hate and Intolerance."

The context aggregator 180 may gather previous dialog data, such as dialog data corresponding to the user 105 and/or the device 110. For example, the content aggregator 180 may determine the context data 225 from the last three dialog interactions (e.g., user input and corresponding system generated response). For example, the context data 225 may be indicative of the subject matter of the current dialog, such as sports, movies, religion, cooking, etc. The context data 225 may be used by the content moderation component 210 as part of the classification process to determine whether the user input data 205 corresponds to an moderated content category 230. The context data 225 may also be used to determine that a possibly appropriate user input, such as "Why do they wear funny hats?", may actually correspond to moderated content based on the preceding user input, such as "Tell me about [religious group]."

The fairness detection component 215 may be configured to identify terms in the user input data 205 that may correspond to a protected class of people. In some embodiments, the fairness detection component 215 may use a term map 220 representing an association or correspondence between certain terms/keywords to a protected class. For example, the term map 220 may include an association between terms "men" or "women" to the "gender" protected class; or the term "amputee" may be associated with the "abilities" protected class. Additionally, the term map 220 may include slang and derogatory terms for different protected classes. In some instances, the user input data may not include harmful language, but may include implicit assumptions, such as about a protected class, that may be harmful. Thus, the detection of protected classes in the user input data and generation of moderating instructions that promote equality may mitigate such instances where moderated content is not detected but a protected class is included in the user input data.

The fairness detection component 215 may use the term map 220 to identify one or more terms found in the 205 and determine a protected class indication(s) 235. As shown in FIG. 2, the fairness detection component 215 may determine an example protected class indication 235 of "[group of people]" for the user input data 205 of "Why are [group of people] [stereotyped behavior]?"

The moderated content category data 230 and the protected class indication 235 may be processed by the belief augmentation component 155 to determine, for example, a policy template and/or a policy to be used to generate prompt data for the language model 165.

Figure 3:
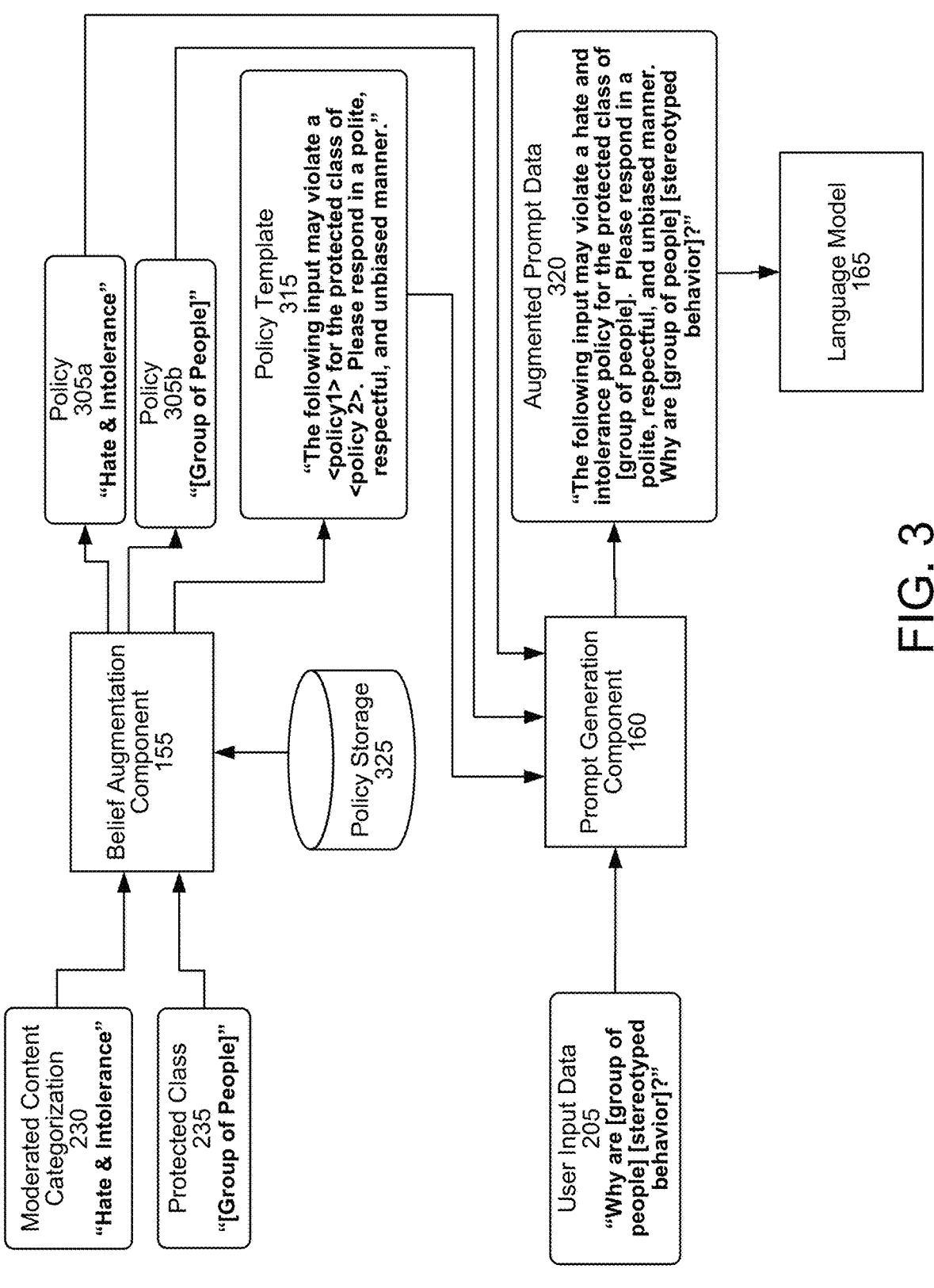
FIG. 3 is a conceptual diagram illustrating processing that may be performed for augmenting a user input, according to embodiments of the present disclosure.

FIG. 3 is a conceptual diagram illustrating processing that may be performed for augmenting a user input, according to embodiments of the present disclosure. For example, processing by the belief augmentation component 155 and the prompt generation component 160 may be performed to generate the augmented prompt data 320 for input to the language model 165.

The belief augmentation component 155 may receive the moderated content category data 230 and the one or more protected class indications 235. The belief augmentation component 155 may determine one or more policies 305 corresponding to the moderated content category data 230 and the one or more protected class indications 235. A policy 305 may be a set of guidelines for the corresponding moderated content category data 230 and the protected class indications 235. For example, a policy 305 corresponding to "Violence" or "Harmful Acts" may include guidelines that causing harm to others is wrong and people should be treated with kindness. The policy 305 may be text data or other natural language representation data, or other types of data. The belief augmentation component 155 may request policy data from a database, such as policy storage 325. For example, the moderated content category data 230 (e.g., "Hate and Intolerance") may correspond to a policy 305*a* for "Hate and Intolerance" and protected class indication 235 (e.g., "[group of people]") may correspond to a policy 305*b* for "[group of people]". The policies 305 may be a set of guidelines to mitigate bias and to avoid an moderated content output (e.g., biased output, harmful output, illegal content, etc.) by the language model 165. The result of including the policy may be the language model 165 generating diversified outputs (e.g. a query about top ranked basketball players returns both male and female players) and achieving statistical parity in model outputs across protected classes (e.g. equitable reference of men and women as doctors).

The policy storage 325 may also store policy templates 315. The belief augmentation component 155 may determine a policy template 315 based on one or more policies 305, the moderated content category data 230 and/or the protected class indication 235. For example, the belief augmentation component 155 may select a first policy template based on the moderated content category data 230 corresponding to "Harmful Information" and may select a second policy template based on the moderated content category data 230 corresponding to "Self-Harm". In some embodiments, the policy template 315 may be a standardized template used for all or some of the moderated content categories 230.

The belief augmentation component 155 may determine the policy template 315 based on other factors independently or in conjunction with the moderated content categorization 230 and/or protected class indication 235. For example, the belief augmentation component 155 may determine a policy template 315 based on aspects of a user profile for the user 105. For example, location data for the user 105 may be used to select a policy template 315 that directs the language model 165 to generate a response that informs the user 105 about how a cultural aspect differs in other regions of the world.

In some embodiments, the belief augmentation component 155 may determine the policy template 315 based on the type of language model 165. The format of an input prompt, in both structure and word choice, may impact the effectiveness of directing the language model 165 toward certain types of responses, such as avoiding moderated content. A policy template 315 may be phrased or have certain keywords depending upon the type of language model 165 that will best direct the language model 165 to generate certain types of responses. In some embodiments, the belief augmentation component 155 may determine the type of the language model 165 based on a language model identifier (e.g., name, identification number, etc.). In some embodiments, the belief augmentation component 155 may determine the type of the language model 165 based on the device 110, such as the type of device, or software of the device (e.g., operating system, browser, etc.).

In some embodiments, the policy template 315 may include parameters to be populated based on the instant user input and corresponding policy 305 information. In some embodiments, the policy template 315 may include parameters for including part of the user input data 205. For example, the user input data 205 may include an inappropriate slang term, such as "[derogatory group name]". An example policy template 315 may state, "Do not use the term [derogatory group name] in the response." As shown in FIG. 3, an example policy template 315 may be selected that states, "The following input may violate a <policy 1> for the protected class of <policy 2>. Please respond in a polite, respectful, and unbiased manner." The example policy template, as shown, has two parameters for populating policy information, such as policies 305*a* and 305*b*.

An example policy template 315 may include instructions to promote equality among members of an identified protected class and/or other protected classes. For example, the policy template 315 may include instructions to use masculine, feminine, and non-gender specific pronouns. In another example, the policy template 315 may include instructions to provide or use statistics for multiple races and/or age ranges.

The prompt generation component 160 may receive, from the belief augmentation component 155, the one or more policies 305 and the policy template 315, as well as the user input data 205. The prompt generation component 160 may populate the parameters of the policy template 315 based on the received data (e.g., policies 305, terms from the user input data 205, user profile information, etc.). The prompt generation component 160 may append the populated policy template 315 (either before or after) to the user input data 205 to generate the augmented prompt data 320. In some embodiments the augmented prompt data 320 may be text (or other type of data) representing natural language input. In some embodiments, the augmented prompt data 320 may be text formatted based on the prompt configuration requirements of the language model 165. As shown in FIG. 3, the policy template 315 populated with policies 305*a* and 305*b*, and appended to user input data 205 may result in example augmented prompt data 320 that states, "The following input may violate a hate and intolerance policy for the protected class of [group of people]. Please respond in a polite, respectful, and unbiased manner. Why are [group of people] [stereotyped behavior]?". The prompt generation component 160 may send the augmented prompt data 320 to the language model 165 for processing.

Figure 4:
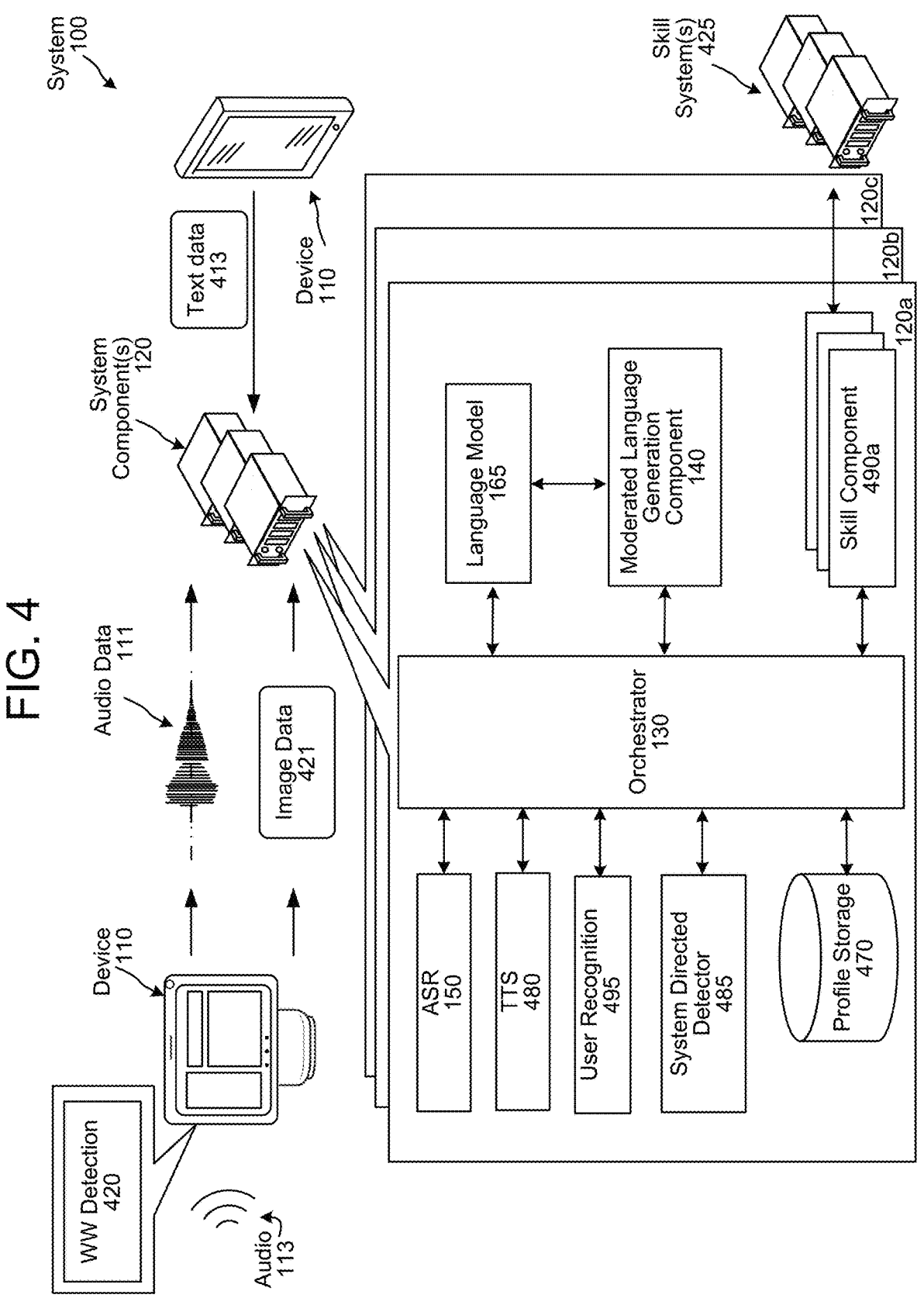
FIG. 4 is a conceptual diagram of components of the system, according to embodiments of the present disclosure.

The system 100 may operate using various components as described in FIG. 4. The various components may be located on same or different physical devices. Communication between various components may occur directly or across a network(s) 199. The device 110 may include audio capture component(s), such as a microphone or array of microphones of a device 110, captures audio 113 and creates corresponding audio data. Once speech is detected in audio data representing the audio 113, the device 110 may determine if the speech is directed at the device 110/system component(s) 120. In at least some embodiments, such determination may be made using a wakeword detection component 420. The wakeword detection component 420 may be configured to detect various wakewords. In at least some examples, each wakeword may correspond to a name of a different digital assistant. An example wakeword/digital assistant name is "Alexa." In another example, input to the system may be in form of text data 413, for example as a result of a user typing an input into a user interface of device 110. Other input forms may include indication that the user has pressed a physical or virtual button on device 110, the user has made a gesture, etc. The device 110 may also capture images using camera(s) 618 of the device 110 and may send image data 421 representing those image(s) to the system component(s) 120. The image data 421 may include raw image data or image data processed by the device 110 before sending to the system component(s) 120. The image data 421 may be used in various manners by different components of the system to perform operations such as determining whether a user is directing an utterance to the system, interpreting a user command, responding to a user command, etc.

The wakeword detector 420 of the device 110 may process the audio data, representing the audio 113, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 113, is analyzed to determine if specific characteristics of the audio data match preconfigured acoustic waveforms, audio signatures, or other data corresponding to a wakeword.

Thus, the wakeword detection component 420 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 420 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 420 and/or input is detected by an input detector, the device 110 may "wake" and begin transmitting audio data 111, representing the audio 113, to the system component(s) 120. The audio data 111 may include data corresponding to the wakeword; in other embodiments, the portion of the audio corresponding to the wakeword is removed by the device 110 prior to sending the audio data 111 to the system component(s) 120. In the case of touch input detection or gesture based input detection, the audio data may not include a wakeword.

In some implementations, the system 100 may include more than one system component(s) 120. The system components 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detector 420 may result in sending audio data to system component 120*a* for processing while detection of the wakeword "Computer" by the wakeword detector may result in sending audio data to system component 120*b* for processing. The system may have a separate wakeword and system for different skills/systems (e.g., "Dungeon Master" for a game play skill/system component 120*c*) and/or such skills/systems may be coordinated by one or more skill(s) 490 of one or more system components 120.

The device 110 may also include a system directed input detector 585. (The system component(s) 120 may also include a system directed input detector 485 which may operate in a manner similar to system directed input detector 585.) The system directed input detector 585 may be configured to determine whether an input to the system (for example speech, a gesture, etc.) is directed to the system or not directed to the system (for example directed to another user, etc.). The system directed input detector 585 may work in conjunction with the wakeword detector 420. If the system directed input detector 585 determines an input is directed to the system, the device 110 may "wake" and begin sending captured data for further processing. If data is being processed the device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 585 determines an input is not directed to the system (such as a speech or gesture directed to another user) the device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 585 is determining whether an input is potentially device directed. For example, the system may output an orange indicator while considering an input, and may output a green indicator if a system directed input is detected. Other such configurations are possible.

Upon receipt by the system component(s) 120, the audio data 111 may be sent to an orchestrator component 130. The orchestrator component 130 may include memory and logic that enables the orchestrator component 130 to transmit various pieces and forms of data to various components of the system, as well as perform other operations as described herein.

130The orchestrator component 130 may send the audio data 111 to the ASR component 150 for processing. The ASR component 150 may transcribe the audio data 111 into text data. The text data output by the ASR component 150 represents one or more than one (e.g., in the form of an N-best list) ASR hypotheses representing speech represented in the audio data 111. The ASR component 150 interprets the speech in the audio data 111 based on a similarity between the audio data 111 and pre-established language models. For example, the ASR component 150 may compare the audio data 111 with models for sounds (e.g., acoustic units such as phonemes, senons, phones, etc.) and sequences of sounds to identify words that match the sequence of sounds of the speech represented in the audio data 111. The ASR component 150 sends the text data generated thereby to the language model 165 and/or the moderated language generation component 140, via, in some embodiments, the orchestrator component 130. The language model 165 and the moderated language generation component 140 may operate as described herein in relation to FIGS. 1A, 1B, 2 and 3. A skill component may be software running on the system component(s) 120 that is akin to a software application. That is, a skill component 490 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 490. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 490 may operate in conjunction between the system component(s) 120 and other devices, such as the device 110, in order to complete certain functions. Inputs to a skill component 490 may come from speech processing interactions or through other interactions or input sources. A skill component 490 may include hardware, software, firmware, or the like that may be dedicated to a particular skill component 490 or shared among different skill components 490.

A skill support system(s) 425 may communicate with a skill component(s) 490 within the system component(s) 120 and/or directly with the orchestrator component 130 or with other components. A skill support system(s) 425 may be configured to perform one or more actions. An ability to perform such action(s) may sometimes be referred to as a "skill." That is, a skill may enable a skill support system(s) 425 to execute specific functionality in order to provide data or perform some other action requested by a user. For example, a weather service skill may enable a skill support system(s) 425 to provide weather information to the system component(s) 120, a car service skill may enable a skill support system(s) 425 to book a trip with respect to a taxi or ride sharing service, an order pizza skill may enable a skill support system(s) 425 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 490 dedicated to interacting with the skill support system(s) 425. Unless expressly stated otherwise, reference to a skill, skill device, or skill component may include a skill component 490 operated by the system component(s) 120 and/or skill operated by the skill support system(s) 425. Moreover, the functionality described herein as a skill or skill may be referred to using many different terms, such as an action, bot, app, or the like. The skill 490 and or skill support system(s) 425 may return output data to the orchestrator 130.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The TTS component 480 may generate audio data (e.g., synthesized speech) from text data using one or more different methods. Text data input to the TTS component 480 may come from a skill component 490, the orchestrator component 130, or another component of the system. In one method of synthesis called unit selection, the TTS component 480 matches text data against a database of recorded speech. The TTS component 480 selects matching units of recorded speech and concatenates the units together to form audio data. In another method of synthesis called parametric synthesis, the TTS component 480 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system component(s) 120 as image data. The device 110 may further include circuitry for voice command-based control of the camera, allowing a user 5 to request capture of image or video data. The device 110 may process the commands locally or send audio data 111 representing the commands to the system component(s) 120 for processing, after which the system component(s) 120 may return output data that can cause the device 110 to engage its camera.

Upon receipt by the system component(s) 120, the image data 421 may be sent to an orchestrator component 130. The orchestrator component 130 may send the image data 421 to an image processing component. The image processing component can perform computer vision functions such as object recognition, modeling, reconstruction, etc. For example, the image processing component may detect a person, face, etc. (which may then be identified using user recognition component 495.

The system component(s) 120 may include a user recognition component 495 that recognizes one or more users using a variety of data. However, the disclosure is not limited thereto, and the device 110 may include a user recognition component 595 instead of and/or in addition to user recognition component 495 of the system component(s) 120 without departing from the disclosure. User recognition component 595 operates similarly to user recognition component 495.

The user-recognition component 495 may take as input the audio data 111 and/or text data output by the ASR component 150. The user-recognition component 495 may perform user recognition by comparing audio characteristics in the audio data 111 to stored audio characteristics of users. The user-recognition component 495 may also perform user recognition by comparing biometric data (e.g., fingerprint data, iris data, etc.), received by the system in correlation with the present user input, to stored biometric data of users assuming user permission and previous authorization. The user-recognition component 495 may further perform user recognition by comparing image data (e.g., including a representation of at least a feature of a user), received by the system in correlation with the present user input, with stored image data including representations of features of different users. The user-recognition component 495 may perform additional user recognition processes, including those known in the art.

The user-recognition component 495 determines scores indicating whether user input originated from a particular user. For example, a first score may indicate a likelihood that the user input originated from a first user, a second score may indicate a likelihood that the user input originated from a second user, etc. The user-recognition component 495 also determines an overall confidence regarding the accuracy of user recognition operations.

Output of the user-recognition component 495 may include a single user identifier corresponding to the most likely user that originated the user input. Alternatively, output of the user-recognition component 495 may include an N-best list of user identifiers with respective scores indicating likelihoods of respective users originating the user input. The output of the user-recognition component 495 may be used to inform NLU processing as well as processing performed by other components of the system.

The system 100 (either on device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 470 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 5:
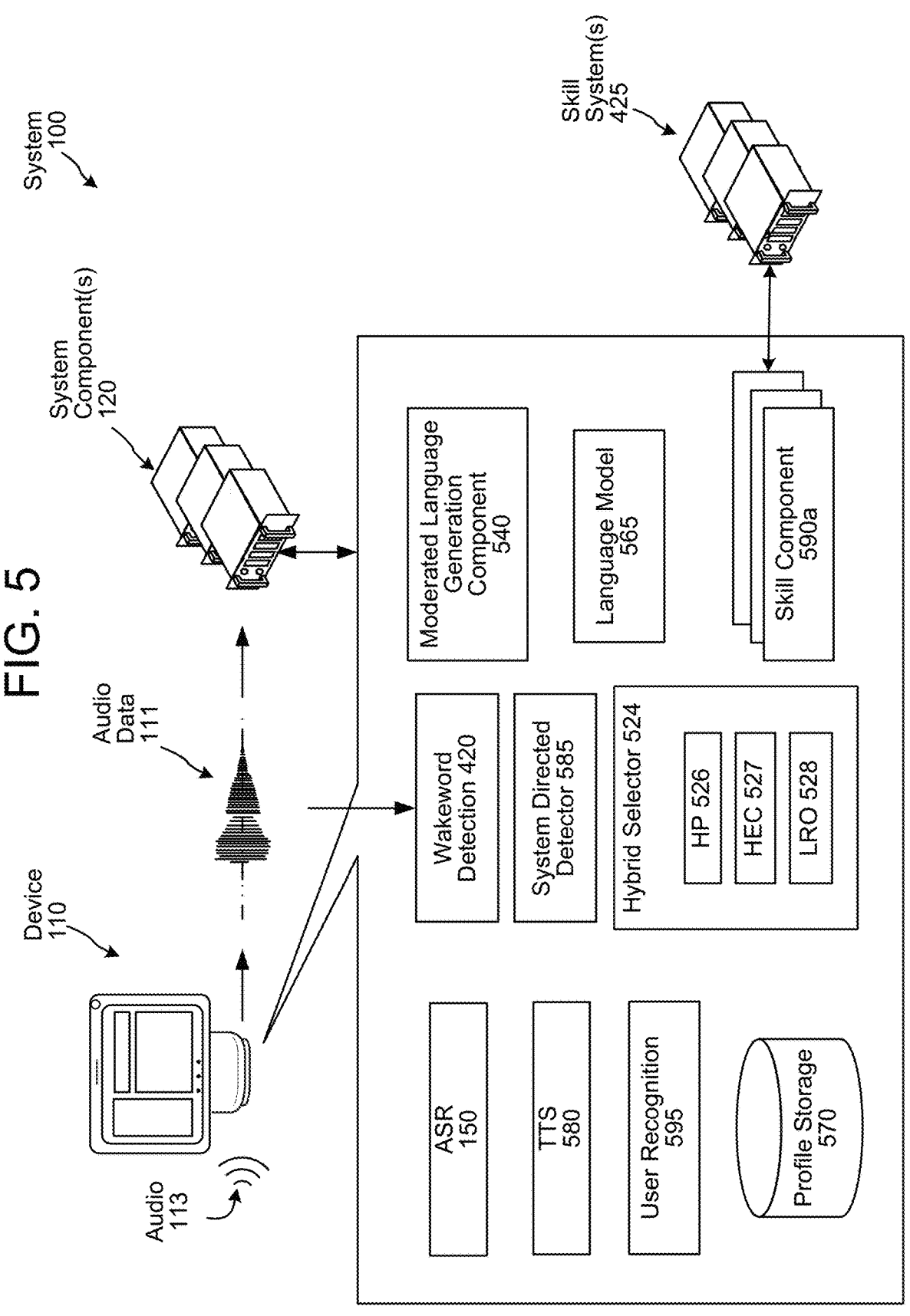
FIG. 5 is a conceptual diagram illustrating components that may be included in a device, according to embodiments of the present disclosure.

Although the components of FIG. 4 may be illustrated as part of system component(s) 120, device 110, or otherwise, the components may be arranged in other device(s) (such as in device 110 if illustrated in system component(s) 120 or vice-versa, or in other device(s) altogether) without departing from the disclosure. FIG. 5 illustrates such a configured device 110.

In at least some embodiments, the system component(s) 120 may receive the audio data 111 from the device 110, to recognize speech corresponding to a spoken input in the received audio data 111, and to perform functions in response to the recognized speech. In at least some embodiments, these functions involve sending directives (e.g., commands), from the system component(s) 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may instruct the device 110 to output an audible response (e.g., using TTS processing performed by an on-device TTS component 580) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 4, the device 110 may include a wakeword detection component 420 configured to compare the audio data 111 to stored models used to detect a wakeword (e.g., "Alexa") that indicates to the device 110 that the audio data 111 is to be processed for determining NLU output data (e.g., slot data that corresponds to a named entity, label data, and/or intent data, etc.). In at least some embodiments, a hybrid selector 524, of the device 110, may send the audio data 111 to the wakeword detection component 420. If the wakeword detection component 420 detects a wakeword in the audio data 111, the wakeword detection component 420 may send an indication of such detection to the hybrid selector 524. In response to receiving the indication, the hybrid selector 524 may send the audio data 111 to the system component(s) 120 and/or the ASR component 150. The wakeword detection component 420 may also send an indication, to the hybrid selector 524, representing a wakeword was not detected. In response to receiving such an indication, the hybrid selector 524 may refrain from sending the audio data 111 to the system component(s) 120, and may prevent the ASR component 150 from further processing the audio data 111. In this situation, the audio data 111 can be discarded.

The device 110 may conduct its own speech processing using on-device language processing components, such as an ASR component 150 and a language model 565), similar to the manner discussed herein with respect to the ASR component 150 and the language model 165 of the system component(s) 120. The language model 165 may operate in a similar manner as the language model 565. The device 110 may also include a moderated language generation component 540, which may operate in a similar manner as the moderated language generation component 140. The device 110 may also internally include, or otherwise have access to, other components such as one or more skill components 590 capable of executing commands determined by the device 110/system component(s) 120 (which may operate similarly to skill components 490), a user recognition component 595 (configured to process in a similar manner to that discussed herein with respect to the user recognition component 495 of the system component(s) 120), profile storage 570 (configured to store similar profile data to that discussed herein with respect to the profile storage 470 of the system component(s) 120), or other components. In at least some embodiments, the profile storage 570 may only store profile data for a user or group of users specifically associated with the device 110. Similar to as described above with respect to skill component 490, a skill component 590 may communicate with a skill system(s) 425. The device 110 may also have its own TTS component 580, which may operate similarly to TTS component 480.

In at least some embodiments, the on-device language processing components may not have the same capabilities as the language processing components of the system component(s) 120. For example, the on-device processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the device 110 attempts to process a natural language user input for which the on-device processing components are not necessarily best suited, the processing results determined by the device 110 may indicate a low confidence or other metric indicating that the processing by the device 110 may not be as accurate as the processing done by the system component(s) 120.

The hybrid selector 524, of the device 110, may include a hybrid proxy (HP) 526 configured to proxy traffic to/from the system component(s) 120. For example, the HP 526 may be configured to send messages to/from a hybrid execution controller (HEC) 527 of the hybrid selector 524. For example, command/directive data received from the system component(s) 120 can be sent to the HEC 527 using the HP 526. The HP 526 may also be configured to allow the audio data 111 to pass to the system component(s) 120 while also receiving (e.g., intercepting) this audio data 111 and sending the audio data 111 to the HEC 527.

In at least some embodiments, the hybrid selector 524 may further include a local request orchestrator (LRO) 528 configured to notify the ASR component 150 about the availability of new audio data 111 that represents user speech, and to otherwise initiate the operations of local language processing when new audio data 111 becomes available. In general, the hybrid selector 524 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system component(s) 120 and chooses to use that remotely-determined directive data.

Thus, when the audio data 111 is received, the HP 526 may allow the audio data 111 to pass through to the system component(s) 120 and the HP 526 may also input the audio data 111 to the on-device ASR component 150 by routing the audio data 111 through the HEC 527 of the hybrid selector 524, whereby the LRO 528 notifies the ASR component 150 of the audio data 111. At this point, the hybrid selector 524 may wait for response data from either or both of the system component(s) 120 or the local language processing components. However, the disclosure is not limited thereto, and in some examples the hybrid selector 524 may send the audio data 111 only to the local ASR component 150 without departing from the disclosure. For example, the device 110 may process the audio data 111 locally without sending the audio data 111 to the system component(s) 120.

The device 110 and/or the system component(s) 120 may associate a unique identifier with each natural language user input. The device 110 may include the unique identifier when sending the audio data 111 to the system component(s) 120, and the response data from the system component(s) 120 may include the unique identifier to identify which natural language user input the response data corresponds.

In at least some embodiments, the device 110 may include, or be configured to use, one or more skill components 590 that may work similarly to the skill component(s) 490 implemented by the system component(s) 120. The skill component(s) 590 may correspond to one or more domains that are used in order to determine how to act on a spoken input in a particular way, such as by outputting a directive that corresponds to the determined intent, and which can be processed to implement the desired operation. The skill component(s) 590 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 425. For example, a skill system 425 may be located in a remote environment (e.g., separate location) such that the device 110 may only communicate with the skill system 425 via the network(s) 199. However, the disclosure is not limited thereto. For example, in at least some embodiments, a skill system 425 may be configured in a local environment (e.g., home server and/or the like) such that the device 110 may communicate with the skill system 425 via a private network, such as a local area network (LAN).

As used herein, a "skill" may refer to a skill component 590, a skill system 425, or a combination of a skill component 590 and a corresponding skill system 425.

Similar to the manner discussed with regard to FIG. 4, the local device 110 may be configured to recognize multiple different wakewords and/or perform different categories of tasks depending on the wakeword. Such different wakewords may invoke different processing components of local device 110 (not illustrated in FIG. 5). For example, detection of the wakeword "Alexa" by the wakeword detector 420 may result in sending audio data to certain components such as ASR 150, skills 590 etc. for processing while detection of the wakeword "Computer" by the wakeword detector may result in sending audio data to different components for processing.

Figure 6:
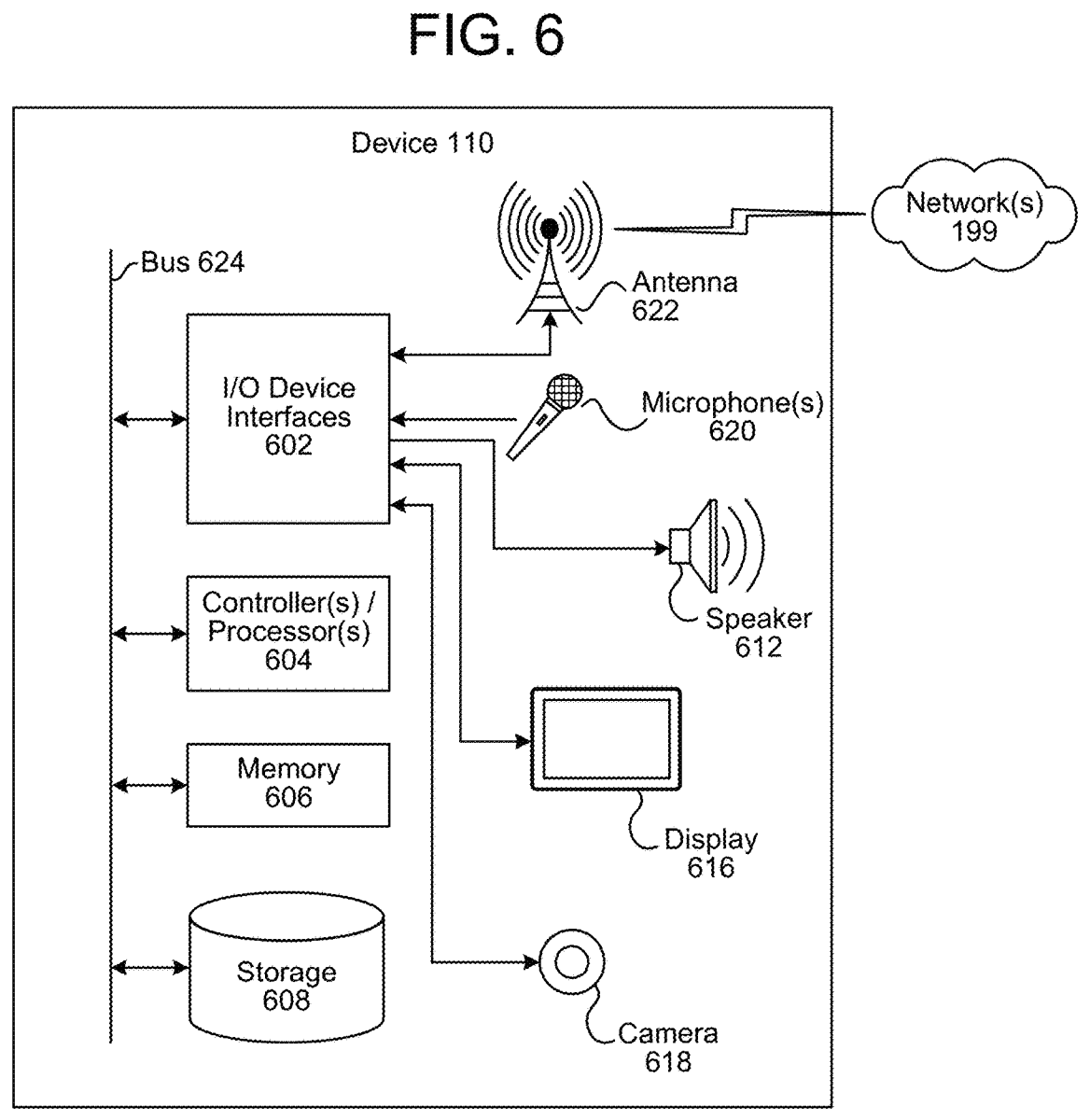
Figure 7:
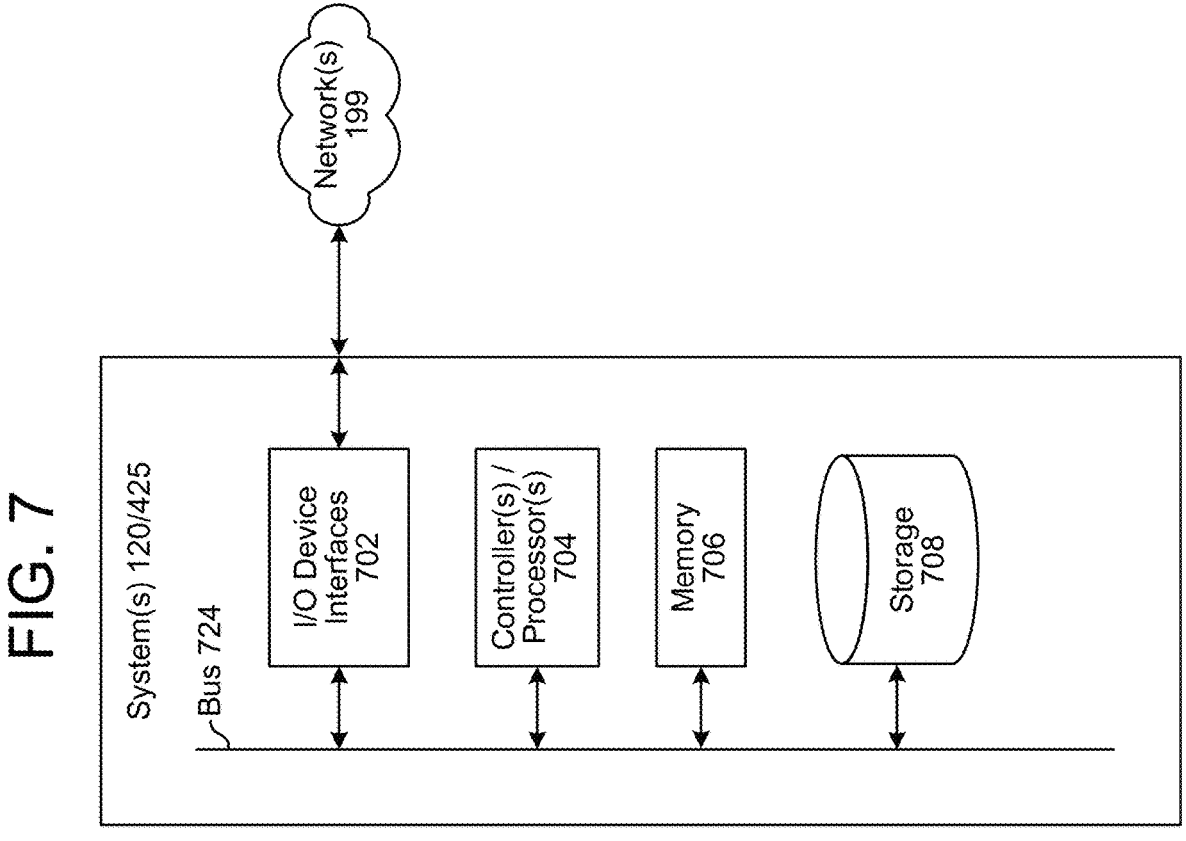
FIG. 7 is a block diagram conceptually illustrating example components of a system, according to embodiments of the present disclosure.

FIG. 6 is a block diagram conceptually illustrating a device 110 that may be used with the system. FIG. 7 is a block diagram conceptually illustrating example components of a remote device, such as the natural language command processing system component(s) 120, which may assist with ASR processing, NLU processing, etc., and a skill system 425. A system (120/425) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) 120 may be located remotely from the device 110 as its operations may not require proximity to the user. The server/system component(s) 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The supporting device 120 may also be a version of a user device 110 that includes different (e.g., more) processing capabilities than other user device(s) 110 in a home/office. One benefit to the server/system component(s) 120 being in a user's home/business is that data used to process a command/return a response may be kept within the user's home, thus reducing potential privacy concerns.

Multiple systems (120/425) may be included in the overall system 100 of the present disclosure, such as one or more natural language processing system components 120 for performing ASR processing, one or more natural language processing system components 120 for performing NLU processing, one or more skill systems 425, etc. In operation, each of these systems may include computer-readable and computer-executable instructions that reside on the respective device (120/425), as will be discussed further below.

Each of these devices (110/120/425) may include one or more controllers/processors (604/704), which may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive memory (MRAM), and/or other types of memory. Each device (110/120/425) may also include a data storage component (608/708) for storing data and controller/processor-executable instructions. Each data storage component (608/708) may individually include one or more non-volatile storage types such as magnetic storage, optical storage, solid-state storage, etc. Each device (110/120/425) may also be connected to removable or external non-volatile memory and/or storage (such as a removable memory card, memory key drive, networked storage, etc.) through respective input/output device interfaces (602/702).

Computer instructions for operating each device (110/120/425) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120/425) includes input/output device interfaces (602/702). A variety of components may be connected through the input/output device interfaces (602/702), as will be discussed further below. Additionally, each device (110/120/425) may include an address/data bus (624/724) for conveying data among components of the respective device. Each component within a device (110/120/425) may also be directly connected to other components in addition to (or instead of) being connected to other components across the bus (624/724).

Referring to FIG. 6, the device 110 may include input/output device interfaces 602 that connect to a variety of components such as an audio output component such as a speaker 612, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 616 for displaying content. The device 110 may further include a camera 618.

Via antenna(s) 622, the input/output device interfaces 602 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (602/702) may also include communication components that allow data to be exchanged between devices such as different physical servers in a collection of servers or other components.

The components of the device(s) 110, the natural language command processing system component(s) 120, or a skill system 425 may include their own dedicated processors, memory, and/or storage. Alternatively, one or more of the components of the device(s) 110, the natural language command processing system component(s) 120, or a skill system 425 may utilize the I/O interfaces (602/702), processor(s) (604/704), memory (606/706), and/or storage (608/708) of the device(s) 110, natural language command processing system component(s) 120, or the skill system 425, respectively. Thus, the ASR component 150 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component(s) 120, and a skill system 425, as described herein, are illustrative, and may be located as a stand-alone device or may be included, in whole or in part, as a component of a larger device or system. As can be appreciated, a number of components may exist either on a system component(s) 120 and/or on device 110. Unless expressly noted otherwise, the system version of such components may operate similarly to the device version of such components and thus the description of one version (e.g., the system version or the local version) applies to the description of the other version (e.g., the local version or system version) and vice-versa.

Figure 8:
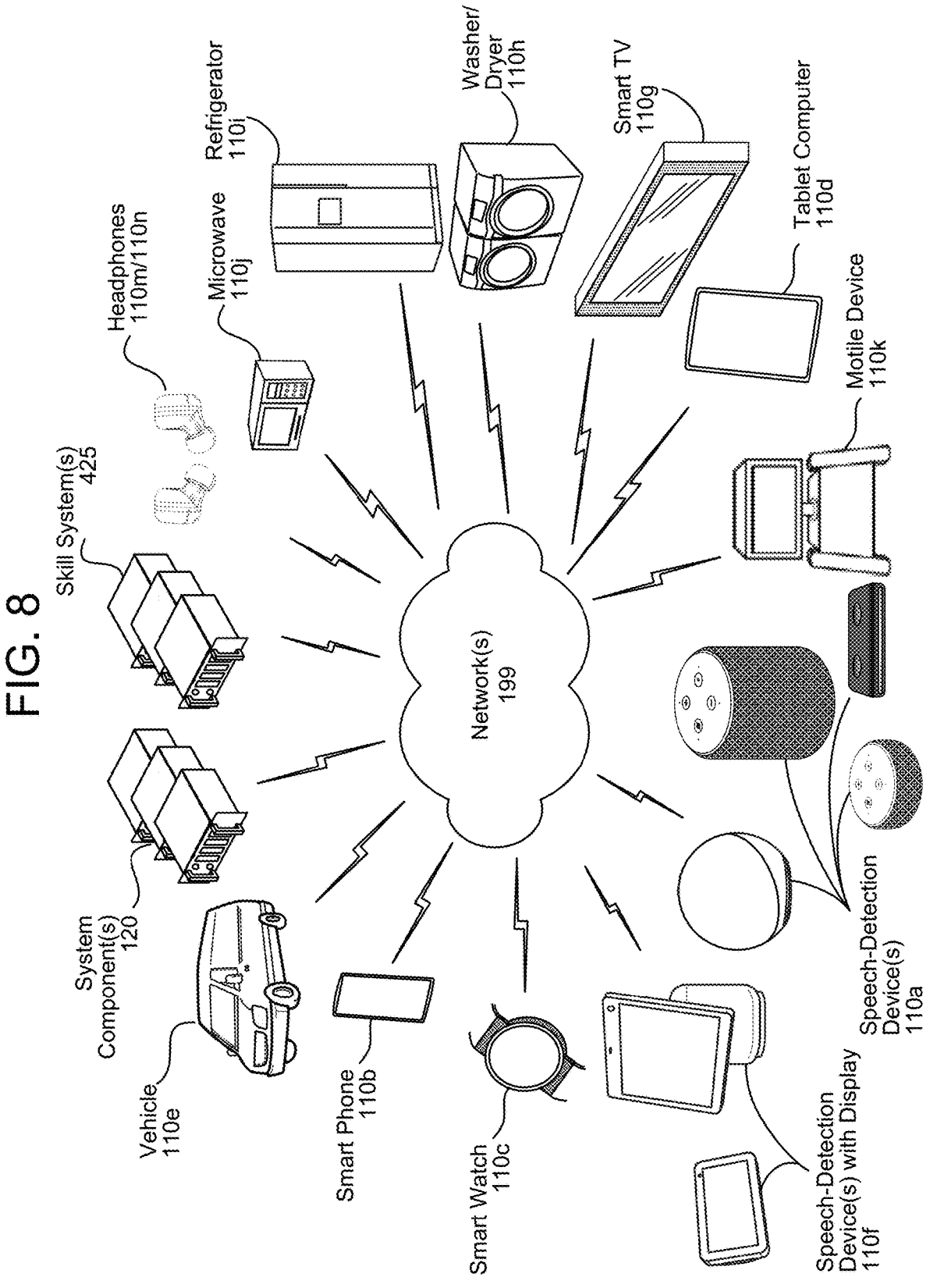
FIG. 8 illustrates an example of a computer network for use with the overall system, according to embodiments of the present disclosure.

As illustrated in FIG. 8, multiple devices (110a-110n, 120, 425) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system(s) 425, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 150, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:

receiving first input data corresponding to a first spoken natural language input;

processing, using a first classifier model configured to classify user inputs to one or more moderated content categories, the first input data to determine that the first spoken natural language input corresponds to a first moderated content category;

determining, based in part on the first moderated content category, first data representing a first policy for processing user inputs corresponding to the first moderated content category;

receiving a first policy template for processing user inputs corresponding to the first moderated content category, the first policy template including at least a first portion to be populated based on the first policy;

generating, using the first policy template and the first data, policy data representing an instruction to a language model to generate a response in view of the first policy;

generating prompt data including the policy data and the first input data;

processing, using the language model, the prompt data to generate output data; and causing presentation of the output data in response to the first spoken natural language input.

2. The computer-implemented method of claim 1, further comprising:

receiving second input data corresponding to a second spoken natural language input received prior to the first spoken natural language input; and receiving second output data generated by the language model and corresponding to the second spoken natural language input, wherein processing using the first classifier model further comprises processing the second input data and the second output data.

3. The computer-implemented method of claim 1, further comprising:

processing, using a second classifier model configured to classify user inputs to one or more protected class categories, the first input data to determine that the first spoken natural language input corresponds to a first protected class category;

determining, based in part on the first protected class category, second data representing a second policy for processing user inputs corresponding to the first protected class category; and receiving a second policy template for processing user inputs corresponding to the first protected class category, the second policy template including a second portion corresponding to information of the second policy, wherein generating the policy data further includes using the second policy template.

4. The computer-implemented method of claim 1, further comprising:

receiving second input data corresponding to a second spoken natural language input;

processing, using the language model, the second input data to generate second output data;

determining, using a second classifier model, that the second output data includes information corresponding to a second moderated content category;

in response to the second output data corresponding to the second moderated content category, determining third output data by modifying the second output data, wherein the third output data corresponds to appropriate content; and causing presentation of the third output data.

5. A computer-implemented method, comprising:

receiving first data representing a first input;

determining the first data corresponds to a first moderated content category;

determining, based on the first moderated content category, second data representing a policy for responding to inputs corresponding to the first moderated content category;

receiving a policy template corresponding to the first moderated content category, the policy template including at least a first portion to be populated based on the second data;

determining prompt data based on the first data, the policy template and the second data; and processing the prompt data, using a language model, to determine first output data responsive to the first input.

6. The computer-implemented method of claim 5, further comprising:

determining the first output data includes content corresponding to a second moderated content category;

determining second output data based on modifying the first output data; and causing presentation of the second output data in response to the first input.

7. The computer-implemented method of claim 5, wherein determining the first data corresponds to a first moderated content category, further comprises:

determining a portion of the first data includes a term;

receiving third data representing at least one moderated term;

determining, using the third data, the term corresponds to a moderated term; and determining the moderated term corresponds to the first moderated content category.

8. The computer-implemented method of claim 5, further comprising:

receiving third data corresponding to a second user input received prior to the first input; and receiving second output data generated by the language model and corresponding to the second input, wherein determining the first data corresponds to the first moderated content category is further based in part on the third data and the second output data.

9. The computer-implemented method of claim 5, further comprising:

receiving the policy template representing response instructions for the language model.

10. The computer-implemented method of claim 9, further comprising:

determining third data representing a type of the language model, wherein the policy template further corresponds to the third data.

11. The computer-implemented method of claim 9, further comprising:

determining fourth data representing a user profile corresponding to the first input; and determining a second portion of the policy template corresponds to at least part of the fourth data, wherein determining the prompt data is further based in part on the fourth data.

12. The computer-implemented method of claim 5, further comprising:

determining the first data corresponds to a protected class of people; and generating third data representing language model instructions to generate an output representative of a plurality of members of the protected class, wherein determining the prompt data is further based in part on the third data.

13. A system, comprising:

at least one processor; and at least one memory comprising instructions that, when executed by the at least one processor, cause the system to:

receive first data representing a first input;

determine the first data corresponds to a first moderated content category;

determine, based on the first moderated content category, second data representing a policy for responding to inputs corresponding to the first moderated content category;

receive a policy template corresponding to the first moderated content category, the policy template including at least a first portion to be populated based on the second data;

determine prompt data based on the first data, the policy template, and the second data; and process the prompt data, using a language model, to determine first output data responsive to the first input.

14. The system of claim 13, wherein the at least one memory further includes instructions that, when executed by the at least one processor, further cause the system to:

determine the first output data includes content corresponding to a second moderated content category;

determine second output data based on modifying the first output data; and cause presentation of the second output data in response to the first input.

15. The system of claim 13, wherein the instructions that cause the system to determine the first data corresponds to a first moderated content category, further cause the system to:

determine a portion of the first data includes a term;

receive third data representing at least one moderated term;

determine, using the third data, the term corresponds to a moderated term; and determine the moderated term corresponds to the first moderated content category.

16. The system of claim 13, wherein the at least one memory further includes instructions that, when executed by the at least one processor, further cause the system to:

receive third data corresponding to a second input received prior to the first input; and receive second output data generated by the language model and corresponding to the second input, wherein determining the first data corresponds to the first moderated content category is further based in part on the third data and the second output data.

17. The system of claim 13, wherein the at least one memory further includes instructions that, when executed by the at least one processor, further cause the system to:

receive the policy template representing response instructions for the language model.

18. The system of claim 17, wherein the at least one memory further includes instructions that, when executed by the at least one processor, further cause the system to:

determine third data representing a type of the language model, wherein the policy template further corresponds to the third data.

19. The system of claim 17, wherein the at least one memory further includes instructions that, when executed by the at least one processor, further cause the system to:

determine fourth data representing a user profile corresponding to the first input; and determine a second portion of the policy template corresponds to at least part of the fourth data, wherein determining the prompt data is further based in part on the fourth data.

20. The system of claim 13, wherein the at least one memory further includes instructions that, when executed by the at least one processor, further cause the system to:

determine the first data corresponds to a protected class of people; and generate third data representing language model instructions to generate a output representative of a plurality of members of the protected class, wherein determining the prompt data is further based in part on the third data.

\* \* \* \* \*